(12) United States Patent
Yamada et al.

(10) Patent No.: US 12,189,060 B2
(45) Date of Patent: Jan. 7, 2025

(54) OPTICAL DISTANCE MEASURING DEVICE

(71) Applicant: DENSO CORPORATION, Kariya (JP)

(72) Inventors: Hitoshi Yamada, Kariya (JP); Yoshiaki Hoashi, Kariya (JP); Fumiaki Mizuno, Kariya (JP); Noriyuki Ozaki, Kariya (JP); Akifumi Ueno, Kariya (JP)

(73) Assignee: DENSO CORPORATION, Kariya (JP)

( * ) Notice: Subject to any disclaimer, the term of this patent is extended or adjusted under 35 U.S.C. 154(b) by 1043 days.

(21) Appl. No.: 17/138,699

(22) Filed: Dec. 30, 2020

(65) Prior Publication Data

US 2021/0149026 A1    May 20, 2021

Related U.S. Application Data

(63) Continuation of application No. PCT/JP2019/024084, filed on Jun. 18, 2019.

(30) Foreign Application Priority Data

Jul. 5, 2018 (JP) .................................. 2018-127977

(51) Int. Cl.
*G01S 7/481* (2006.01)
*G01S 7/484* (2006.01)
*G02B 5/10* (2006.01)
*G02B 26/12* (2006.01)
*G02B 27/30* (2006.01)

(52) U.S. Cl.
CPC .......... *G01S 7/4817* (2013.01); *G01S 7/4814* (2013.01); *G01S 7/484* (2013.01); *G02B 5/10* (2013.01); *G02B 26/121* (2013.01); *G02B 27/30* (2013.01)

(58) Field of Classification Search
None
See application file for complete search history.

(56) References Cited

U.S. PATENT DOCUMENTS

| 2004/0065814 | A1* | 4/2004 | Miyazaki | G01S 17/42 |
| | | | | 250/222.1 |
| 2007/0076186 | A1* | 4/2007 | Miyazaki | G01S 17/42 |
| | | | | 356/5.01 |
| 2007/0181810 | A1* | 8/2007 | Tan | G01S 7/4811 |
| | | | | 250/341.1 |
| 2011/0118943 | A1 | 5/2011 | Han et al. | |
| 2015/0097947 | A1 | 4/2015 | Hudman et al. | |

(Continued)

FOREIGN PATENT DOCUMENTS

| JP | H07-043643 A | 2/1995 |
| JP | H11-044750 A | 2/1999 |

(Continued)

*Primary Examiner* — Luke D Ratcliffe
(74) *Attorney, Agent, or Firm* — Maschoff Brennan

(57) ABSTRACT

An optical distance measuring device includes a light emitting element in which a plurality of light emitting units 16 that emit light are arranged so that a gap is present between adjacent ones of the light emitting units, a transmission unit through which the light is transmitted, a drive unit that changes a positional relationship between the light emitting element and the transmission unit, and a light receiving unit that receives reflected light of the light. The drive unit changes the positional relationship between the light emitting element and the transmission unit, thereby changing an irradiation path of the light along an arrangement direction.

7 Claims, 6 Drawing Sheets

(56) References Cited

U.S. PATENT DOCUMENTS

| | | |
|---|---|---|
| 2015/0109604 A1 | 4/2015 | Masuda |
| 2015/0362585 A1 | 12/2015 | Ghosh et al. |
| 2017/0307737 A1* | 10/2017 | Ishikawa ............... G01S 7/4815 |
| 2017/0307758 A1 | 10/2017 | Pei et al. |
| 2017/0307759 A1 | 10/2017 | Pei et al. |
| 2017/0350983 A1 | 12/2017 | Hall et al. |
| 2018/0364333 A1 | 12/2018 | Jungwirth et al. |
| 2019/0011567 A1* | 1/2019 | Pacala ................... G01S 7/4815 |
| 2019/0018108 A1* | 1/2019 | Gao ........................ G01S 17/89 |
| 2019/0101645 A1* | 4/2019 | DeMersseman ......... B60Q 1/52 |

FOREIGN PATENT DOCUMENTS

| | | |
|---|---|---|
| JP | H11-326498 A | 11/1999 |
| JP | 2007-155467 A | 6/2007 |
| JP | 2009-204691 A | 9/2009 |

* cited by examiner

OPTICAL DISTANCE MEASURING DEVICE

CROSS-REFERENCE TO RELATED APPLICATION

The present application is based on and claims the benefit of priority from earlier Japanese Patent Application No. 2018-127977 filed on Jul. 5, 2018, the description of which is incorporated herein by reference.

BACKGROUND

Technical Field

The present disclosure relates to an optical distance measuring device.

Related Art

A conventionally known light emitting element includes a plurality of light emitting units arranged so that a gap is present between adjacent light emitting units.

SUMMARY

As an aspect of the present disclosure, an optical distance measuring device is provided. The device includes: a light emitting element in which a plurality of light emitting units that emit light are arranged so that a gap is present between adjacent ones of the light emitting units; a transmission unit through which the light is transmitted; a drive unit that changes a positional relationship between the light emitting element and the transmission unit; and a light receiving unit that receives reflected light of the light. The drive unit changes the positional relationship between the light emitting element and the transmission unit, thereby changing an irradiation path of the light along an arrangement direction.

DETAILED DESCRIPTION OF THE PREFERRED EMBODIMENTS

A conventionally known light emitting element includes a plurality of light emitting units arranged so that a gap is present between adjacent light emitting units (e.g., JP H7-43643 A).

When a light emitting element described in JP H7-43643 A is used in an optical distance measuring device, there has been a problem that due to a gap between light emitting units, a region that is not irradiated with light occurs at a sufficiently distant position irradiated with light from the light emitting units of the optical distance measuring device, and no distance measurement can be performed in the region. Thus, it has been desired to provide a method of preventing occurrence of a region that is not irradiated with light due to a gap between light emitting units.

A. First Embodiment

Figure 1:
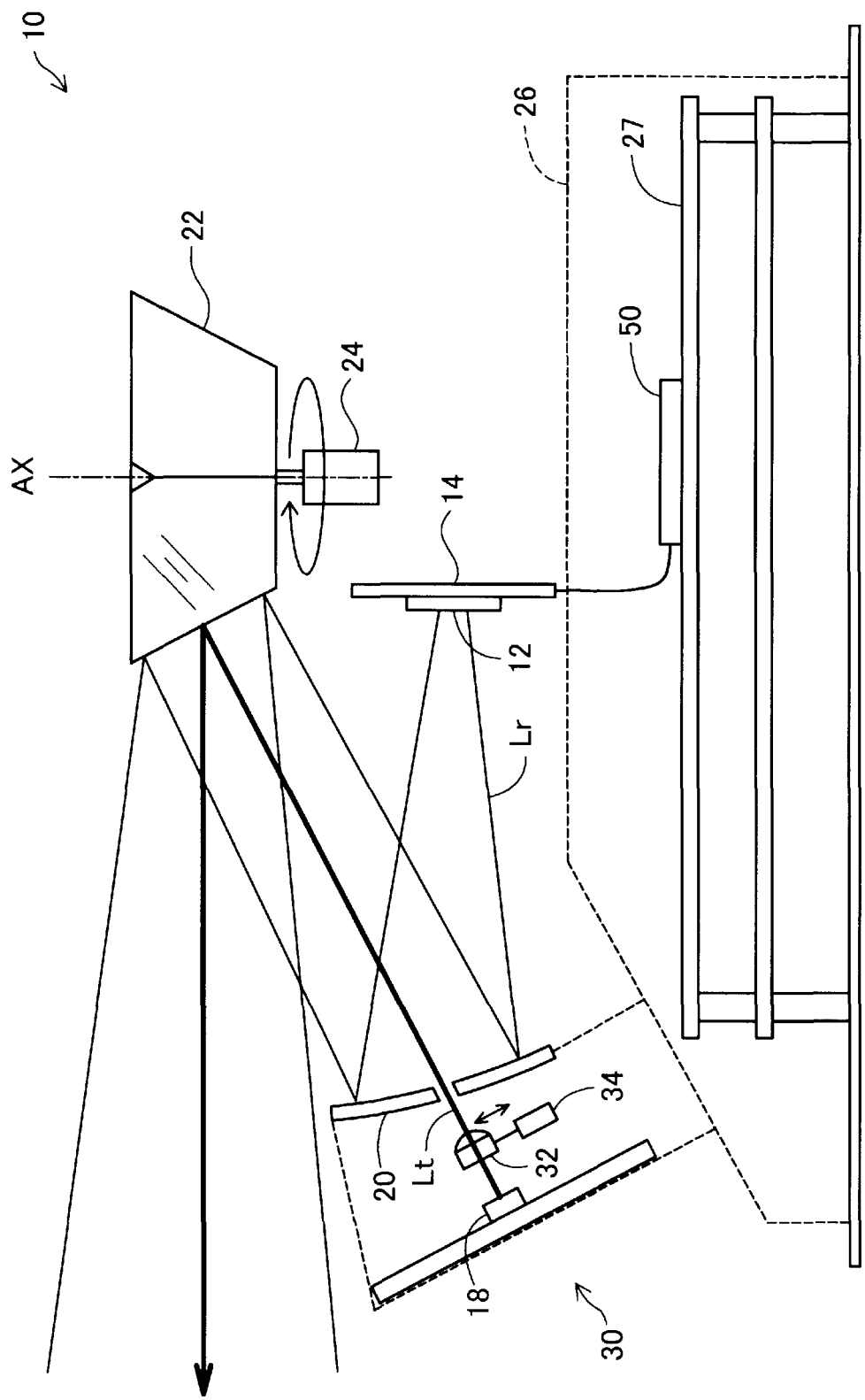
FIG. 1 is a schematic diagram showing an optical distance measuring device of a first embodiment.

As shown in FIG. 1, an optical distance measuring device 10 according to a first embodiment includes a light source unit 30, a light receiving unit 12, a light receiving IC 14, a hyperboloidal mirror 20, a polygon mirror 22, a housing 26, and a control unit 50. The optical distance measuring device 10 is a device that measures a distance to a measurement object on the basis of time of flight (TOF) which is a time period from when the light source unit 30 emits light to when the light returns to the light receiving unit 12 after being reflected by the measurement object. The optical distance measuring device 10 is mounted, for example, to a vehicle.

Figure 2:
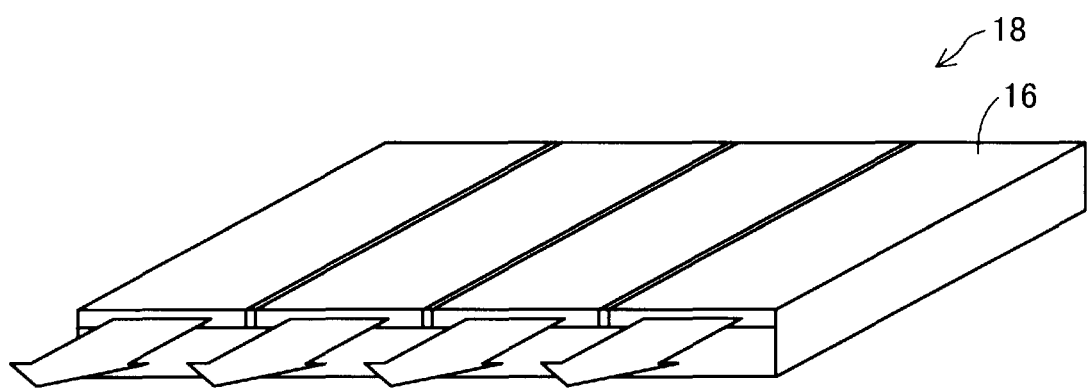
FIG. 2 is a schematic diagram of a light emitting element.

The light source unit 30 includes a light emitting element 18. As shown in FIG. 2, in the light emitting element 18, a plurality of light emitting units 16 that emit light are arranged so that a gap is present between adjacent light emitting units 16. The gap separates current paths of a first light emitting unit 16 and a second light emitting unit 16 adjacent to the first light emitting unit 16. Light is emitted in a direction indicated by the arrows in FIG. 2, and the emitted light is also referred to as irradiation light Lt. The light emitting element 18 of the present embodiment is a laser diode element, and emits, as the irradiation light Lt, pulse laser light that repeatedly blinks with a predetermined pulse width and cycle. The light emitting element 18 may be, for example, a light source other than the laser diode element, such as a solid-state laser.

When the irradiation light Lt is transmitted through an exit lens 32, the irradiation light Lt becomes a parallel light flux. In the present embodiment, the exit lens 32 that causes the irradiation light Lt to be substantially parallel light functions as a transmission unit through which the irradiation light Lt is transmitted. The phrase "causes the irradiation light Lt to be substantially parallel light" indicates that the irradiation light Lt is caused to be light within ±5° of parallel light.

A drive unit 34 of the present embodiment is a member that changes a positional relationship between the light emitting element 18 and the exit lens 32. In the present embodiment, the drive unit 34 is a piezoelectric element, but the drive unit 34 is not limited to this. The drive unit 34 may be, for example, a solenoid or a motor such as a stepping motor or an ultrasonic motor.

The polygon mirror 22 is a polygonal mirror having a plurality of mirror surfaces, and is rotated by a motor 24. The polygon mirror 22 of the present embodiment has six mirror surfaces. In the polygon mirror 22, the irradiation light Lt is reflected by the mirror surfaces and directed toward the outside of the optical distance measuring device 10. When the irradiation light Lt is reflected from the measurement object, part of the reflected light reaches the polygon mirror 22. In the polygon mirror 22, reflected light Lr which is the light that has reached the polygon mirror 22 is reflected by the mirror surfaces and guided to the hyperboloidal mirror 20.

The hyperboloidal mirror 20 collects the reflected light Lr guided by the polygon mirror 22, and guides the reflected light Lr to the light receiving unit 12 of the light receiving IC 14. Thus, the light receiving unit 12 receives the reflected light Lr.

The light receiving unit 12 includes a plurality of light receiving elements that can output a pulse signal according to incidence of the reflected light Lr from the measurement object. In the present embodiment, the light receiving element is a SPAD (single photon avalanche diode), but the light receiving element is not limited to this. The light receiving element may be, for example, a PN photodiode, a PIN photodiode, or an avalanche photodiode that is operated in a linear region.

The mirror surfaces of the polygon mirror 22 are inclined at different angles with respect to a rotation axis AX. The polygon mirror 22 is rotated at a predetermined rotation speed around the rotation axis AX. Thus, when the polygon mirror 22 is rotated, an elevation angle of the irradiation light Lt and a depression angle of the reflected light Lr are changed. As a result, the irradiation light Lt from the light source unit 30 can be scanned not only in a horizontal direction but also at different depression angles. The present embodiment uses the polygon mirror 22, but the mirror is not limited to this, and for example, a mirror having a single surface may be used. In this case, by changing the angle of the rotation axis AX for each rotation, the elevation angle of the irradiation light Lt and the depression angle of the reflected light Lr can be changed as in the polygon mirror 22.

The housing 26 has a support structure that supports the above components, and includes a control substrate 27. The control unit 50 is provided on the control substrate 27. The control unit 50 is configured as a computer including a CPU and a memory, and controls the constituent members of the optical distance measuring device 10 including the light emitting element 18, the drive unit 34, and the light receiving unit 12. In the optical distance measuring device 10, the control unit 50 controls the drive unit 34 to change the positional relationship between the light emitting element 18 and the exit lens 32, thereby changing an irradiation path of the irradiation light along an arrangement direction of the light emitting units 16. In this manner, by using a simple structure that is necessary and sufficient to achieve the purpose, it is possible to prevent occurrence of a region that is not irradiated with light due to the gap between the light emitting units 16. The mechanism will be described below.

Figure 3:
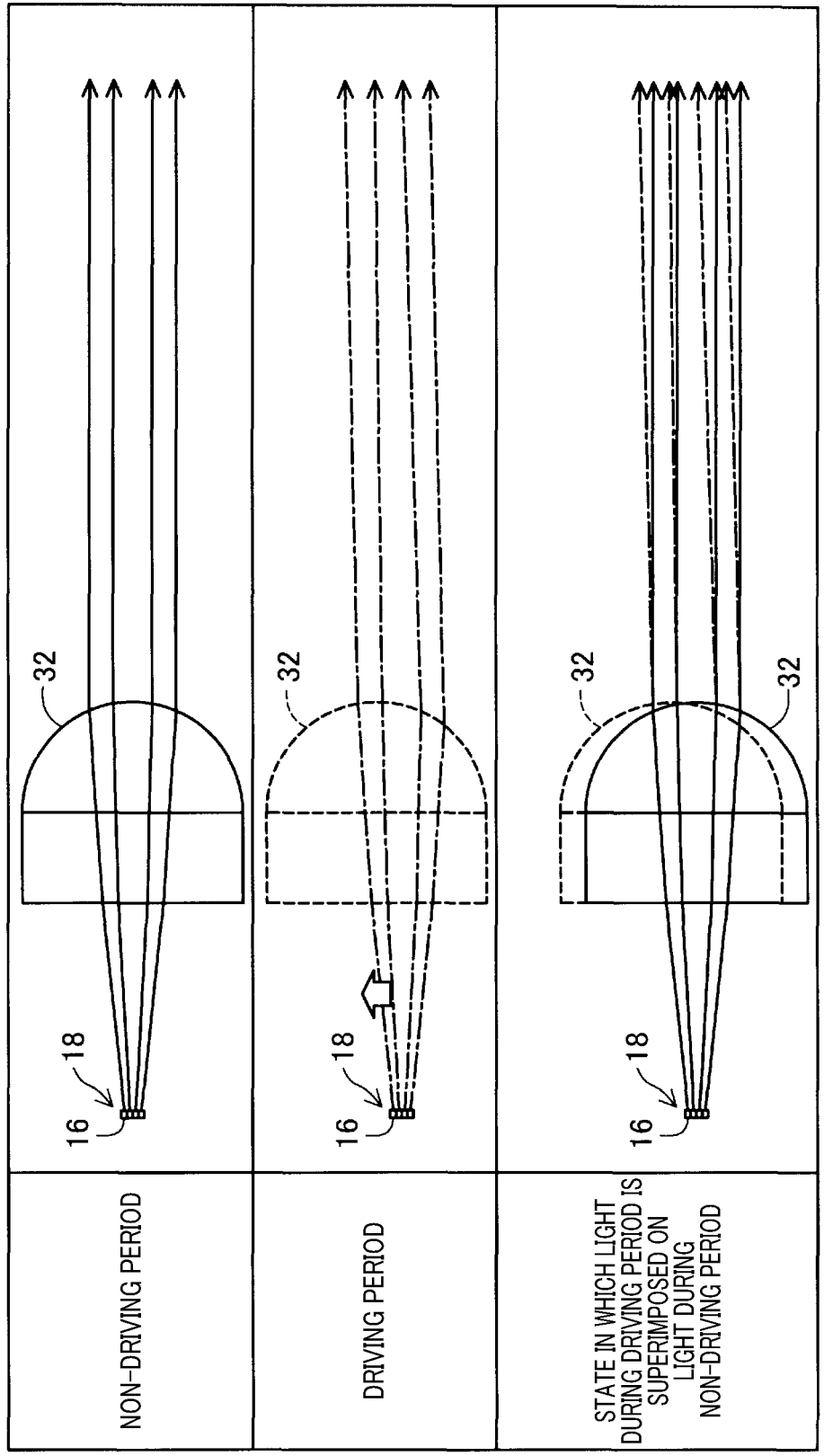
FIG. 3 shows a relationship between driving of an exit lens by a drive unit and irradiation light.

FIG. 3 shows (i) a state during a non-driving period in which the exit lens 32 is not driven by the drive unit 34, (ii) a state during a driving period in which the exit lens 32 is driven by the drive unit 34, and (iii) a state in which irradiation light Lt during the driving period is superimposed on irradiation light Lt during the non-driving period. As shown in FIG. 3, the drive unit 34 changes the positional relationship between the light emitting element 18 and the exit lens 32, thereby changing an irradiation path of the irradiation light Lt along the arrangement direction. Specifically, the drive unit 34 changes the positional relationship between the light emitting element 18 and the exit lens 32 by an amount that is necessary and sufficient to cover a non-irradiated region due to the gap between the adjacent light emitting units 16 at a sufficiently distant position irradiated with the light from the light emitting units 16 of the optical distance measuring device 10, thereby changing the irradiation path of the irradiation light Lt along the arrangement direction. For example, the gap between the adjacent light emitting units 16 of the laser diode element is approximately several tens of micrometers to 100 micrometers at most. For a change in the positional relationship that is necessary and sufficient to cover the non-irradiated region due to the gap, it is enough to provide a simple and small drive mechanism.

Thus, the optical distance measuring device 10 of the present embodiment can prevent occurrence of a region that is not irradiated with light due to the gap between the light emitting units 16, by using a simple and small drive mechanism. Furthermore, the present embodiment can prevent occurrence of a region that is not irradiated with light due to the gap between the light emitting units 16, without adding a new component other than the drive unit 34. Between the driving period and the non-driving period by the drive unit 34, a light receiving region of the light receiving unit 12 in which the reflected light Lr is received varies. That is, the light receiving unit 12 has a region in which the reflected light Lr is received only during the driving period or only during the non-driving period. Thus, the control unit 50 may adjust sensitivity of the light receiving unit 12 so that a signal intensity of this region is the same as that of a region in which the light is received both during the driving period and during the non-driving period. In this manner, it is possible to reduce a difference in the signal intensity between the light receiving regions.

Figure 4:
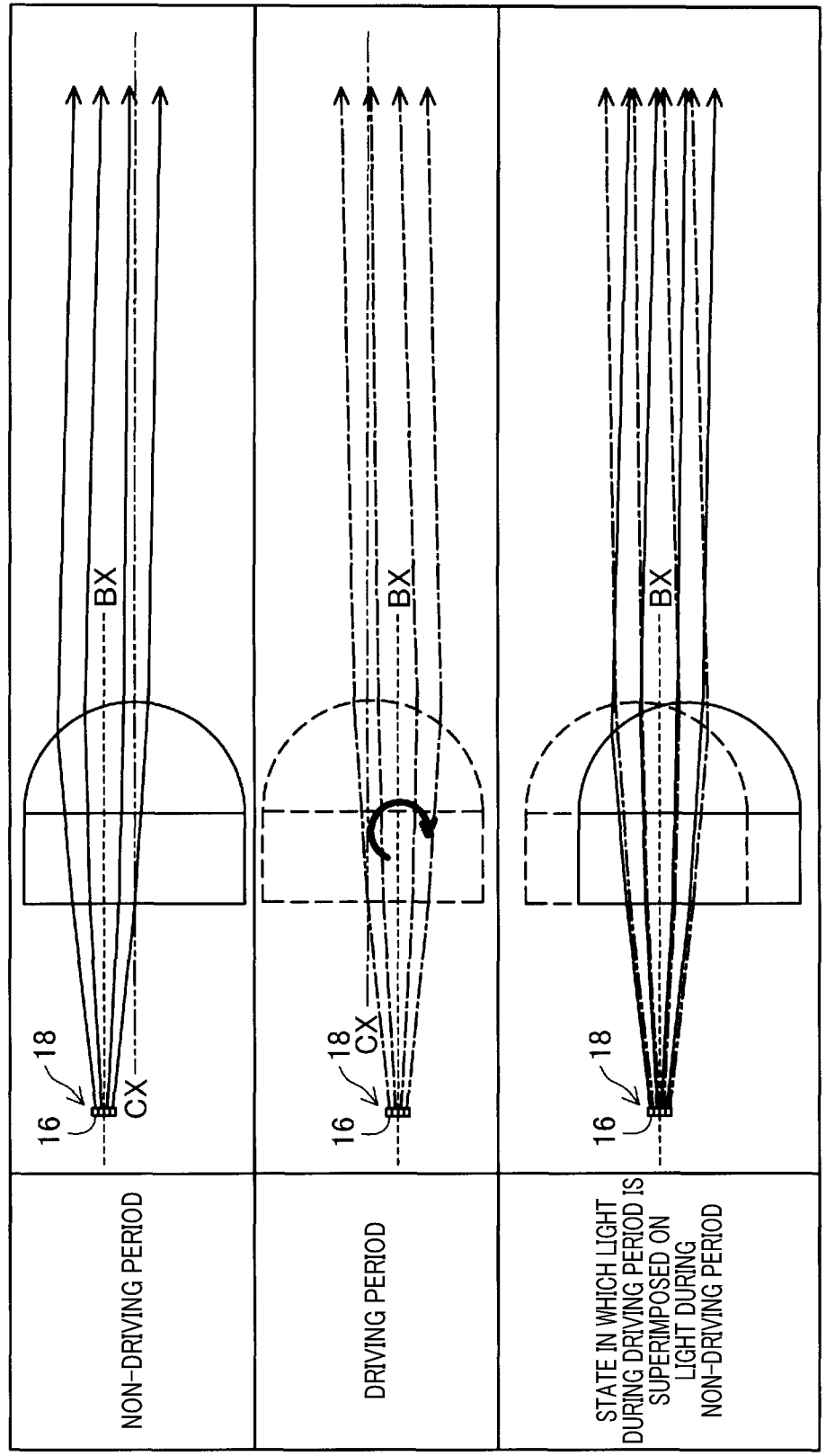
FIG. 4 illustrates a configuration in which the exit lens is rotationally moved.

In the first embodiment, the exit lens 32 is moved parallel to the light emitting element 18 by the drive unit 34, but movement of the exit lens 32 is not limited to this. For example, the exit lens 32 may be rotationally moved by the drive unit 34. FIG. 4 shows a configuration in which the exit lens 32 is rotationally moved around an axis BX that is different from a center axis CX of the exit lens 32. As in FIG. 3, FIG. 4 also shows (i) a state during the non-driving period in which the exit lens 32 is not driven by the drive unit 34, (ii) a state during the driving period in which the exit lens 32 is driven by the drive unit 34, and (iii) a state in which irradiation light Lt during the driving period is superimposed on irradiation light Lt during the non-driving period. As shown in FIG. 4, also when the exit lens 32 is rotationally moved by the drive unit 34, the optical distance measuring device 10 of the present embodiment can prevent occurrence of a region that is not irradiated with light due to the gap between the light emitting units 16. In FIGS. 3 and 4, the light emitted from the light emitting element 18 is illustrated as a line having no width. However, actually, as shown in FIG. 2, the light emitting units 16 have a certain width in the arrangement direction, and the width is larger than the gap provided between the adjacent light emitting units 16.

B. Second Embodiment

Figure 5:
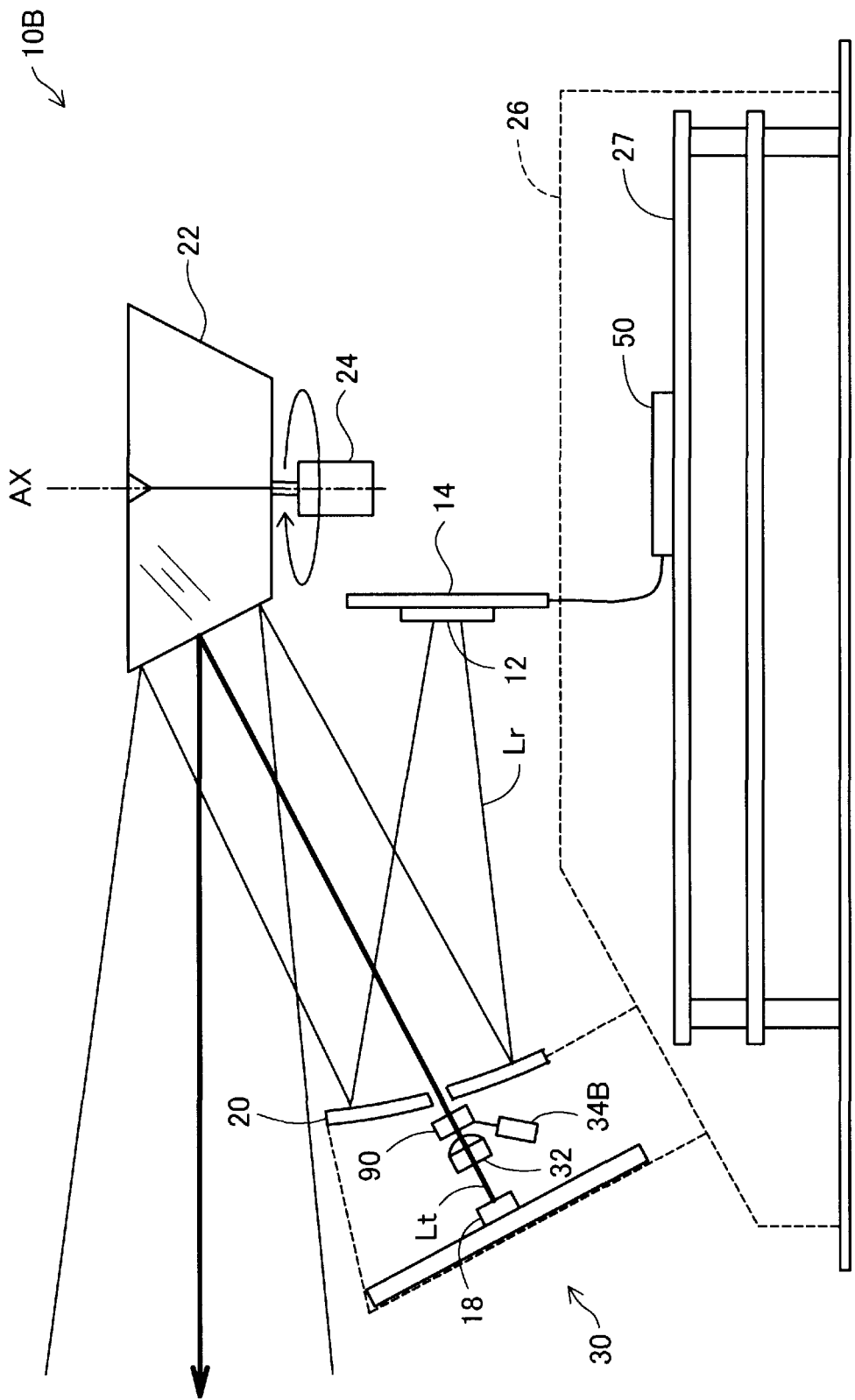
FIG. 5 is a schematic diagram showing an optical distance measuring device of a second embodiment.

As shown in FIG. 5, an optical distance measuring device 10B of a second embodiment differs from the optical distance measuring device 10 of the first embodiment in that the optical distance measuring device 10B includes a transmission unit 90 separately from the exit lens 32 and that a drive unit 34B drives the transmission unit 90 instead of the exit lens 32. Other than these points, the optical distance measuring device 10B of the second embodiment is the same as the optical distance measuring device 10 of the first embodiment.

Figure 6:
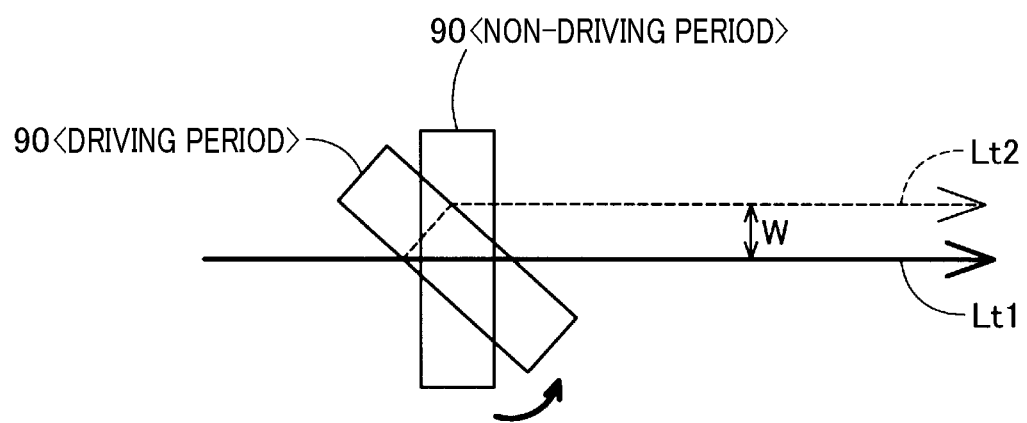
FIG. 6 shows a relationship between driving of a transmission unit by a drive unit and irradiation light.

FIG. 6 shows a state during a driving period in which the transmission unit 90 is driven by the drive unit 34B and a state during a non-driving period in which the transmission unit 90 is not driven by the drive unit 34B. In FIG. 6, during the non-driving period, irradiation light Lt1 is transmitted through the transmission unit 90 without being refracted. On the other hand, during the driving period, irradiation light Lt2 is refracted while being transmitted through the transmission unit 90. As a result, as shown in FIG. 6, by controlling the drive unit 34B, the control unit 50 can irradiate with light a region that is not irradiated with light during the non-driving period by the drive unit 34. A variation width W of an irradiation path of the light according to driving of the transmission unit 90 is preferably more than 0 μm and 100 μm or less. In this manner, it is possible to drive the transmission unit 90 by a small driving force and eliminate the need for a large space for driving the transmission unit 90.

In the present embodiment, the exit lens 32 is provided between the light emitting element 18 and the transmission unit 90. In this manner, after the irradiation light Lt becomes a parallel light flux through the exit lens 32, the irradiation light Lt is transmitted through the transmission unit 90. Thus, as compared with the first embodiment, in the second embodiment, the optical system is easily designed and reliability is high. The position of the transmission unit 90 is not limited to this, and the transmission unit 90 may be provided, for example, between the light emitting element 18 and the exit lens 32.

C. Other Embodiments

The above embodiments employ the coaxial optical system in which an optical axis for projection of light matches an optical axis for reception of light. However, the optical system is not limited to this, and may be a non-coaxial optical system in which an optical axis for projection of light differs from an optical axis for reception of light.

The above embodiments show, as an example, the transmission unit 90 whose cross section has a rectangular shape (parallel plate), but the transmission unit 90 is not limited to this, and the transmission unit 90 may have, for example, a cross section of a wedge shape (triangle).

The present disclosure is not limited to the embodiments described above, and can be implemented in various configurations without departing from the scope of the present disclosure. For example, in order to solve some or all of the problems described above or to achieve some or all of the effects described above, replacement or combination may be performed as appropriate in the technical features in the embodiments corresponding to the technical features in each embodiment described in Summary. Unless the technical features are described as essential in the present specification, the technical features may be deleted as appropriate.

An embodiment of the present disclosure provides an optical distance measuring device (10, 10B). The optical distance measuring device includes: a light emitting element (18) in which a plurality of light emitting units (16) that emit light are arranged so that a gap is present between adjacent ones of the light emitting units; a transmission unit (32, 90) through which the light is transmitted; a drive unit (34, 34B) that changes a positional relationship between the light emitting element and the transmission unit; and a light receiving unit (12) that receives reflected light of the light, wherein the drive unit changes the positional relationship between the light emitting element and the transmission unit, thereby changing an irradiation path of the light along an arrangement direction.

The optical distance measuring device according to the above embodiment can prevent occurrence of a region that is not irradiated with light due to a gap between light emitting units.

What is claimed is:

1. An optical distance measuring device comprising:
   a light emitting element in which a plurality of light emitting units that emit light are arranged so that a gap is present between adjacent ones of the light emitting units;
   a transmission unit through which the light is transmitted, the light emitting element and the transmission unit having an original positional relationship therebetween;
   a drive unit that changes the original positional relationship between the light emitting element and the transmission unit; and
   a light receiving unit that receives reflected light of the light, wherein
   the drive unit rotationally drives the transmission unit so that the original positional relationship between the light emitting element and the transmission unit is changed to a changed positional relationship between the light emitting element and the rotationally moved transmission unit, thereby changing an irradiation path of the light along an arrangement direction of the light emitting units.

2. The optical distance measuring device according to claim 1, wherein:
   the transmission unit is an exit lens that causes the light to be substantially parallel light; and
   the drive unit rotationally drives the transmission unit.

3. The optical distance measuring device according to claim 1, further comprising
   an exit lens that causes the light to be substantially parallel light, wherein
   the drive unit rotationally drives the transmission unit.

4. The optical distance measuring device according to claim 3, wherein
   the exit lens is provided between the transmission unit and the light emitting element.

5. The optical distance measuring device according to claim 3, wherein
   a variation width of the irradiation path according to driving of the transmission unit is more than 0 μm and 100 μm or less.

6. The optical distance measuring device according to claim 1, wherein
   a position of the changed positional relationship is defined by a non-irradiated region due to the gap present between the adjacent ones of the light emitting units.

7. The optical distance measuring device according to claim 1, wherein
   the transmission unit comprises an exit lens,
   the exit lens comprises a center axis,
   the exit lens is rotated by the drive unit about a rotation axis, and
   the center axis rotates about the rotation axis.

\* \* \* \* \*